(12) United States Patent
Meisenheimer et al.

(10) Patent No.: US 10,146,802 B2
(45) Date of Patent: Dec. 4, 2018

(54) GENERATING DEVICE SPECIFIC THUMBNAILS

(75) Inventors: David Norman Richard Meisenheimer, Carp (CA); Michael Gordon Washburn, Orleans (CA); Jordan Douglas Barnes, Stittsville (CA); Edward Eric Thomas, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 828 days.

(21) Appl. No.: 12/951,953

(22) Filed: Nov. 22, 2010

(65) Prior Publication Data

US 2011/0125711 A1 May 26, 2011

Related U.S. Application Data

(60) Provisional application No. 61/263,811, filed on Nov. 23, 2009.

(51) Int. Cl.
*G06F 17/30* (2006.01)
(52) U.S. Cl.
CPC .... *G06F 17/3028* (2013.01); *G06F 17/30578* (2013.01); *G06F 17/30581* (2013.01)
(58) Field of Classification Search
CPC .......... G06F 17/3028; G06F 17/30581; G06F 17/30578; G06F 17/30017;
(Continued)

(56) References Cited

U.S. PATENT DOCUMENTS 5,761,655 A * 6/1998 Hoffman ............. G06F 17/3025
7,945,535 B2 * 5/2011 Toutonghi ......... G06F 17/30265
348/207.99

(Continued)

FOREIGN PATENT DOCUMENTS

EP 2112815 A2 10/2009

OTHER PUBLICATIONS

Extended European Search Report from related European Patent Application No. 10192119.5, dated Jun. 6, 2011; 6 pages.
(Continued)

*Primary Examiner* — Greta L Robinson
(74) *Attorney, Agent, or Firm* — Thomas Grzesik; Fleit Gibbons Gutman Bongini & Bianco P.L.

(57) ABSTRACT

A method for generating device specific thumbnails may includes receiving one or more databases on a computing device from a mobile electronic device where the one or more databases include a key file and a data file. The data file may include picture data and the key file may include an index to the picture data. Also, the method may include generating a synchronization set on the computing device wherein the synchronization set includes one or more picture files to be stored on the mobile electronic device. The one or more databases may be transformed to one or more updated databases, wherein the transforming includes updating the key file to index pictures included in the synchronization set and updating the data file to include thumbnails of the pictures included in the synchronization set. The one or more updated databases may be transmitted to the mobile electronic device.

19 Claims, 4 Drawing Sheets

(58) Field of Classification Search
CPC ......... G06F 17/30067; G06F 17/30575; G06F 12/0253; H04N 5/23229
USPC ............... 707/609–617, 620–621, 628–630, 707/632–634, 636–637, 640, 649, 707/656–660, 662–665, 689–690, 707/692–696, 698, 703, 747, 821, 825, 707/912–913, 915, 999.107, 999.201, 707/999.204
See application file for complete search history.

(56) References Cited

U.S. PATENT DOCUMENTS

| | | | | |
|---|---|---|---|---|
| 2003/0117502 A1* | 6/2003 | Heiles | ................ | H04N 1/0035 348/231.2 |
| 2003/0140050 A1* | 7/2003 | Li | ..................... | G06F 17/30578 |
| 2005/0216524 A1* | 9/2005 | Gomes et al. | ................ | 707/201 |
| 2005/0219608 A1 | 10/2005 | Wada | | |
| 2006/0112150 A1* | 5/2006 | Brown et al. | ................ | 707/201 |
| 2006/0224620 A1* | 10/2006 | Silverman et al. | ........ | 707/104.1 |
| 2006/0242163 A1* | 10/2006 | Miller et al. | .................. | 707/100 |
| 2007/0088674 A1* | 4/2007 | Kawate | ............. | G06F 17/30858 |
| 2007/0156434 A1* | 7/2007 | Martin | ................... | G06Q 10/06 705/1.1 |
| 2007/0203948 A1* | 8/2007 | Yoshida | ................ | G06F 3/1206 |
| 2007/0271312 A1* | 11/2007 | Heller et al. | .................. | 707/201 |
| 2008/0189390 A1* | 8/2008 | Heller | .................... | G11B 27/10 709/218 |
| 2008/0243959 A1* | 10/2008 | Bacastow et al. | ............ | 707/204 |
| 2009/0295991 A1* | 12/2009 | Stafford | ............. | H04N 1/00204 348/500 |
| 2010/0115254 A1* | 5/2010 | Deng | .................. | G06F 9/44505 713/1 |

OTHER PUBLICATIONS

Communication under Rule 71(3) EPC, European Application No. 10192119.5.0 dated Sep. 13, 2017.

\* cited by examiner

GENERATING DEVICE SPECIFIC THUMBNAILS

CROSS-REFERENCE TO RELATED APPLICATION

This non-provisional patent application claims the benefit of the filing date of U.S. Provisional Patent Application Ser. No. 61/263,811; filed Nov. 23, 2009; and entitled, "GENERATING DEVICE SPECIFIC THUMBNAILS," the contents of which is incorporated by reference herein.

BACKGROUND

Synching software allows a user to sync a mobile electronic device with selected media items on a personal computer. Mobile electronic devices may include files that have been copied from an external source, such as a user's personal computer.

BRIEF DESCRIPTION OF THE DRAWINGS

Some embodiments are illustrated by way of example and not limitation in the figures of the accompanying drawings in which.

DETAILED DESCRIPTION

Figure 1:
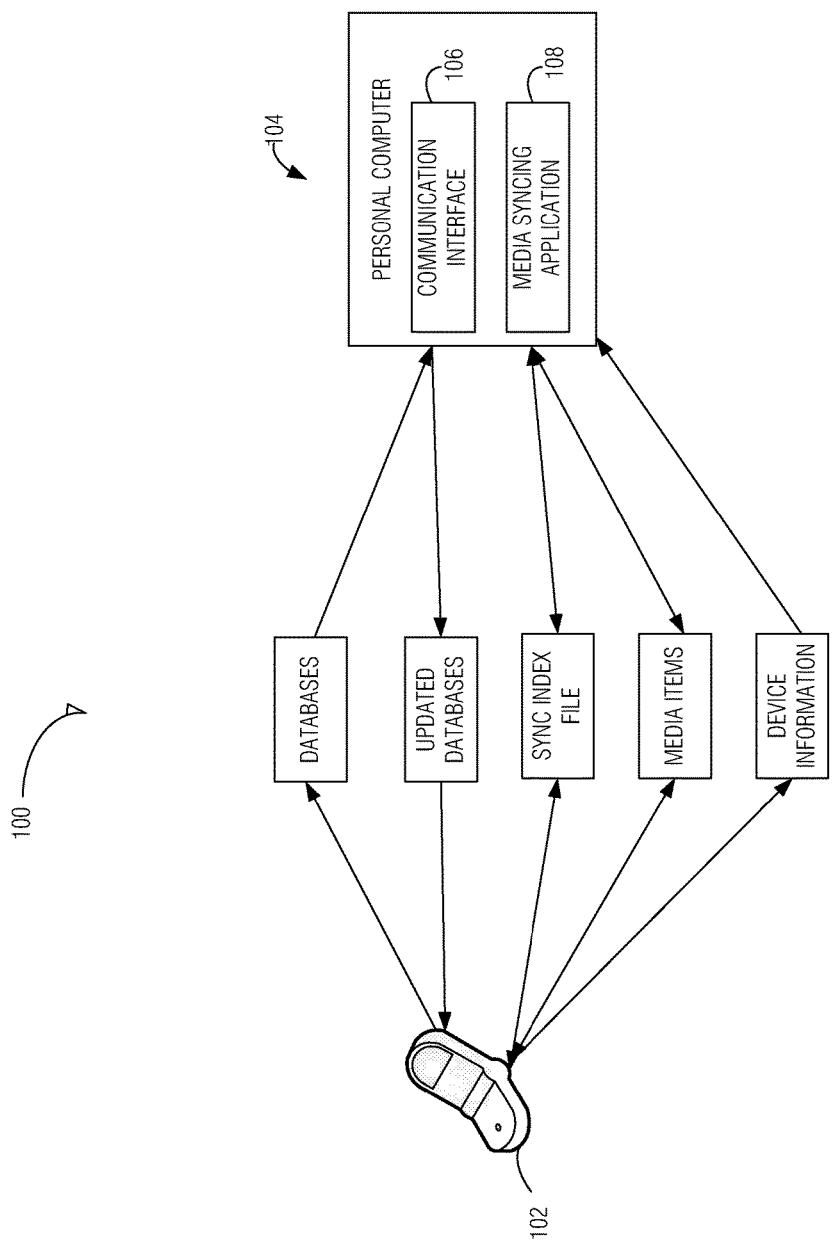
FIG. 1 illustrates a system including a personal computer and a mobile electronic device, according to an example embodiment.

The following detailed description includes references to the accompanying drawings, which form a part of the detailed description. The drawings show, by way of illustration, specific embodiments in which the embodiments may be practiced. These embodiments, which are also referred to herein as "examples," are illustrated in enough detail to enable those skilled in the art to practice the same. The embodiments may be combined, other embodiments may be utilized, or structural, logical, and electrical changes may be made without departing from the scope of the present disclosure. In this document, the terms "a" or "an" are used, as is common in patent documents, to include one or more than one.

In an example embodiment, a user is in control of a mobile electronic device (MED). Mobile electronic devices include, but are not limited to, mobile telephones, portable computers, PDAs, and other devices that may be conveniently carried by a user and sometimes provide wireless communication. Mobile telephones include wireless communication devices that have generally been referred to as cell phones. Mobile telephones may include a wide range of communication devices from portable phones with limited functionality beyond voice communication to portable phones capable of providing functionality of a personal computer (e.g., internet connectivity, web browsing, document editing). Higher functioning phones that include functions similar to a personal computer may be referred to as smart phones.

Managing media items stored a mobile electronic device presents a number of challenges. For example, in various embodiments, when picture files are stored on a MED they are often much larger than necessary to display on the MED's small screen. In order to display a picture on the device or to display a small image representing the picture in a grid of thumbnails, the device generally applies a processor-intensive algorithm to resize the picture data in the original file then displays it on the device's screen. This disclosure describes a process to limit the amount of resizing necessary to view the images on a screen or in thumbnail views, by taking the original picture file, applying a resizing algorithm which throws out large amounts of data from the original file and stores the resulting picture data in a database. Thus, when the device needs to display a picture it does need to go back to the original file and instead can obtain the picture data from the appropriate database. This allows the picture to be displayed on screen much more quickly than if the data had to be retrieved from the original file each time it was to be displayed. Additionally, since the media syncing application running on the desktop may maintain these databases on behalf of the device, the device does not need to apply the processor-intensive resizing algorithms in the first place. This improves battery life of the device and means that pictures are available for viewing on the MED more quickly after a sync.

In an example embodiment, the MED stores one or more media items in one or more file formats. Media items may include content in any media format. Some examples of content may include, but are not limited to, audio files, video files, image files, and multimedia files. More specific examples include, but are not limited to, picture, music, movies, music videos, television shows, interactive applications, audiobooks, podcasts, game, and presentations. Audio file formats may include, but are not limited to, MP3, AIFF, WAV, MPEG-4, AAC, and Apple Lossless. Other example file formats for media items include, but are not limited to, files having extensions doc, dot, wpd, txt, xls, pdf, ppt, jpg, jpeg, png, bmp, gif, html, htm, zip, tif, tiff, and wmf.

The media items may be stored on a MED and be operated on by an associated playing device (player) on the MED that provides an output that may be presented as communication, information, entertainment, other presentations, or combinations thereof for the user of the player. In an embodiment, the MED may have audio, video, playlists, and/or picture files stored in internal memory storage on the MED and further audio, video, and picture files may be stored on an external card (SD card) that is capable of being inserted into the MED. For example, a music file that is stored on the MED may be played back using an audio playback application.

Additionally, there exists a computing device, such as a personal computer, with additional media items. A personal computer (PC), as is generally known, herein refers to computing devices having an operating system (OS) so use of the personal computer may be conducted by individuals having little or no knowledge of the basics of the underlying hardware and software of the computing device. Portable computers may include portable personal computers. An example of a portable PC is a laptop computer or notebook computer that has a display screen, keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network. Other devices, such as mobile wireless communication devices, may be implemented to manage media content.

In an embodiment, a media syncing application generates commands between the personal computer and MED to sync media items between the two devices. In various embodiments, the user selects, via a user interface of the media syncing application, the media items the user wishes to have on her MED.

In order to function efficiently, one or more files are created, stored, and updated on the MED to facilitate synching. In an embodiment, one or more database files are stored on the MED. The one or more database files include an index file and data file. The index file includes references to the media items stored on the MED and where in the data file the raw data of the media items are located. Additional metadata concerning the media items are stored in the data file. In addition to the database files, a sync index file is maintained on the MED that includes data related to what is stored on the MED and its syncing status.

In various embodiments an analysis is completed on user selected media items to predict the amount of space the media items will take up on an MED after synching. When selecting media items, a user may be alerted if the analysis indicates that not all of the media items will be able to be stored on the MED. The analysis may use data included in the database files and sync index file to predict the amount of space that will be used on the MED after a sync is completed.

FIG. 1 illustrates an example system 100 that may be used to sync media items between a MED and a personal computer. Illustrated is mobile electronic device 102, personal computer 104, and communications interface 106. Further illustrated, are examples of data that may be transferred between MED 102 and personal computer 104 via communications interface 106. For example, some of the illustrated data include databases, updated databases, a sync index file, device information, and media items.

In various embodiments, a user connects the MED to a personal computer using a physical connection (e.g., a USB connection). In various embodiments the connection is made using a wireless protocol such as Bluetooth or 802.11a/b/g/n. Upon connecting the MED to the personal computer, media syncing application 108 is launched on the personal computer. In an embodiment, the media syncing application is launched automatically when the personal computer detects the MED is connected. In further embodiments, the media syncing application is launched manually by a user.

In various embodiments, the launched media syncing application is presented on a display device of the personal computer. The media syncing application may display media items that are currently stored on the MED together with media items that are stored on the personal computer. In an embodiment, the media items stored on both devices are presented in a unified user interface with check boxes that indicate if the media item is currently present on the MED. The media syncing application may determine which media items are currently stored on the MED by processing the sync index file. Additionally, if the media item is a picture file, an option may be presented to the user which allows the picture to be resized for his or her MED.

In an embodiment, the media syncing application is configured to accept user inputs (e.g., via a mouse, touch screen display, or keyboard) that activate one or more of the check boxes presented in the media syncing application. A synchronization set is generated based, in part, on the selected media items. The synchronization set may include a greater or lesser number of media items than were initially presented to the user. For example, a user may decide to add some media items to the MED and remove other media items.

In an embodiment, the media syncing application generates commands that are executed on the personal computer and MED to transfer the media items included in the synchronization set. In various embodiments, the commands are generated, in part, based on what type of the device the MED is, what media items are already stored on the MED, whether or not the media items need to be resized, what quality the media items are, and whether or not the media items need to be compressed.

Database Files

Figure 2:
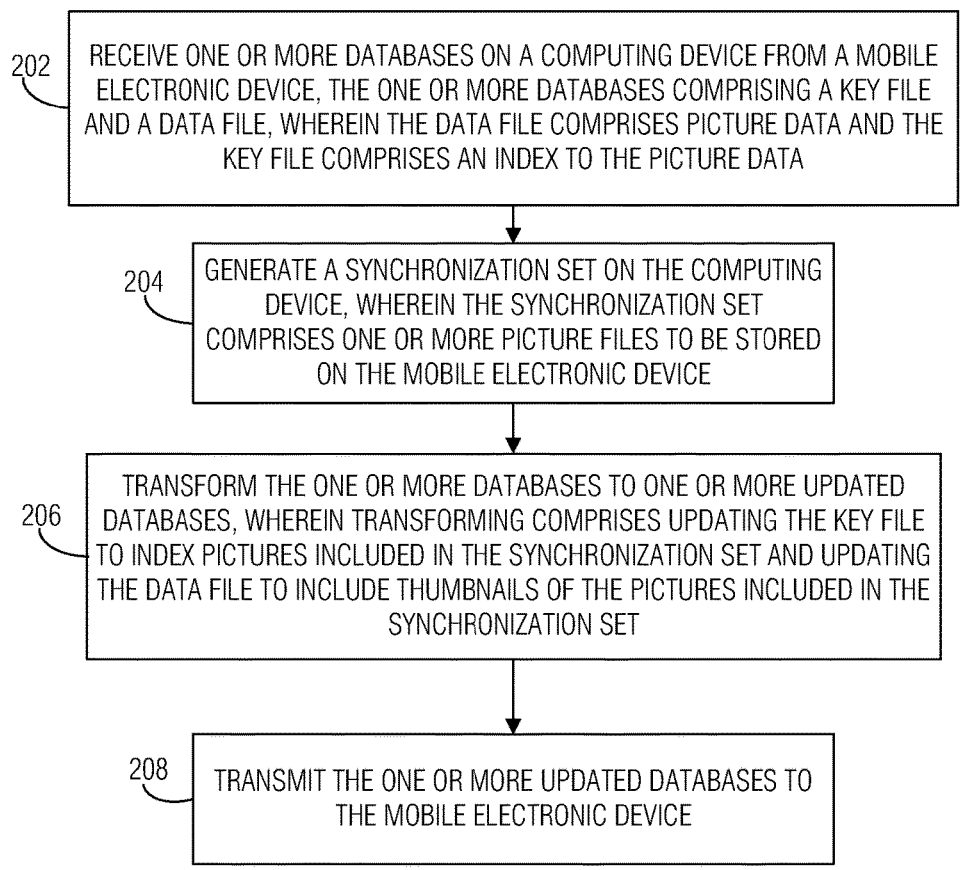
FIG. 2 illustrates a flowchart diagram to transfer media items to a mobile electronic device, according to an example embodiment.

In various embodiments, the database files that are stored on the MED enable quick access to the metadata associated with the media items that are stored on the MED. The media syncing application updates these databases during a synchronization of media items so that less processing is required by the MED after new media items have been transferred from a personal computer. FIG. 2 illustrates an example method using database files to synchronize media items between a personal computer and a mobile electronic device.

Figure 3:
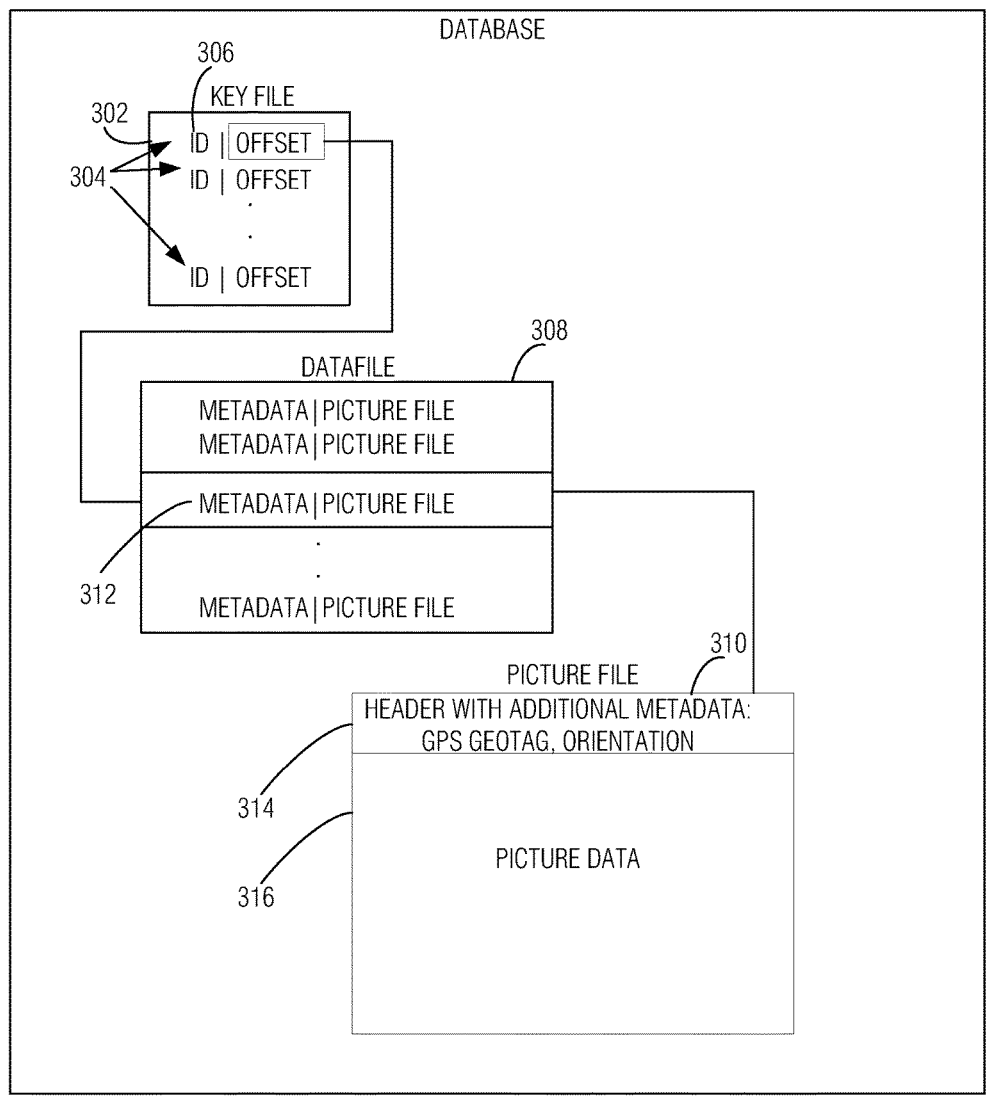
FIG. 3 illustrates a database, according to an example embodiment.

In an example embodiment, at block 202, one or more databases on a computing device are received from a mobile electronic device. FIG. 3 illustrates an example database. As illustrated, a database comprises two files: a key file and a data file. In an embodiment, the data file comprises picture data that includes thumbnails of pictures. In an example embodiment, the key file comprises an index to the thumbnails.

In an example embodiment, at block 204, a synchronization set on the computing device is generated. In the following examples it is assumed a user is selecting one or more original picture files (also referred to simply as picture files) to sync to his or her mobile electronic device. For example, a user may use the media syncing application to select one or more picture files. Some of these picture files may already be stored on the mobile electronic device in one form or another (e.g., a compressed version) and some may currently only be stored on the personal computing device.

In various embodiments, indicia of the pictures stored on the mobile electronic device and computing device may be displayed on a display device of the computing device. The indicia may be a thumbnail of the picture. Additionally, a preference indicator (e.g., a checkbox) may be displayed next to the indicia that indicate whether or not the picture is currently on the mobile electronic device. In an embodiment, a selection of pictures stored on the mobile electronic device and pictures stored on the computing device is received by the media syncing application. The selection is based, at least in part, on the pictures selected using the preference indicators.

In an example embodiment, at block 206, one or more of the databases are transformed to one or more updated databases. For example, when a MED is connected to a computing device, a copy of the database files on the MED may be transferred and stored locally on the computing device.

In an embodiment, transforming includes updating the key file to index pictures included in the synchronization set and updating the data file to include thumbnails of the pictures included in the synchronization set. For example, one or more entries may be made in the key file for pictures files that were not on the MED before the synchronization. Similarly, entries may be removed from the key file when a picture is deselected for synchronization.

In an embodiment, updating the data file includes retrieving device information associated with the mobile electronic device. The device information may include a resolution of a display of the mobile electronic device. Updating the data file may further include generating thumbnails for the picture files in the synchronization set at the resolution of the display. For example, a check may be performed by examining the key file and data file to see if a thumbnail has been generated for a picture file.

If a thumbnail is not stored in the data file, one may be generated and stored in the data file. Additionally, in various embodiments, a thumbnail may be regenerated if a thumbnail is already in the data file but it is outdated. For example, a newer version of a picture file may be available on the computing device. In an example embodiment, generated thumbnails are stored in the updated data file. In an embodiment, picture files that have been selected for removal from the MED are removed from the data file.

In an embodiment, updating the key file includes generating index entries for thumbnails missing from the key file. In an embodiment, missing means an entry for a picture file is not present in the key file. In an embodiment, generating an index entry may create a "collision" with an existing entry in the key file. In an embodiment, an index entry includes at least an identification and an offset, wherein the offset identifies a location in the data file. If a hash function is used to generate an identification, one of the generated identifications may be generated that already is in use. In an embodiment, the data file decides how to handle the collision.

In an example embodiment, at block 208, the one or more updated database files are transferred back to the mobile electronic device. In this manner, much of the processor intensive work is done on the computing device and the resulting database file may be transferred back to the mobile electronic device for use.

In various embodiments, one or more copy commands may be generated to copy a portion of the picture files included in the synchronization set from the computing device to the mobile electronic device. This may be a separate process compared to the database files. In an embodiment, the portion of the picture files is based on picture files that are not already stored on the MED or picture files on the MED that are outdated. In an embodiment, the one or more copy commands are executed on one or more processors of the computing device and mobile electronic device.

In another example embodiment, preference data for the synchronization set may be received. For example, the preference data includes preferences for a quality of a picture and a preference for resizing the picture. Pictures files may be copied to the mobile electronic device when the indicated quality or size is not presently stored on the mobile electronic device. In an embodiment, whether or not a picture is the right quality or size may be determined by examining a sync index file on the mobile electronic device.

Figure 4:
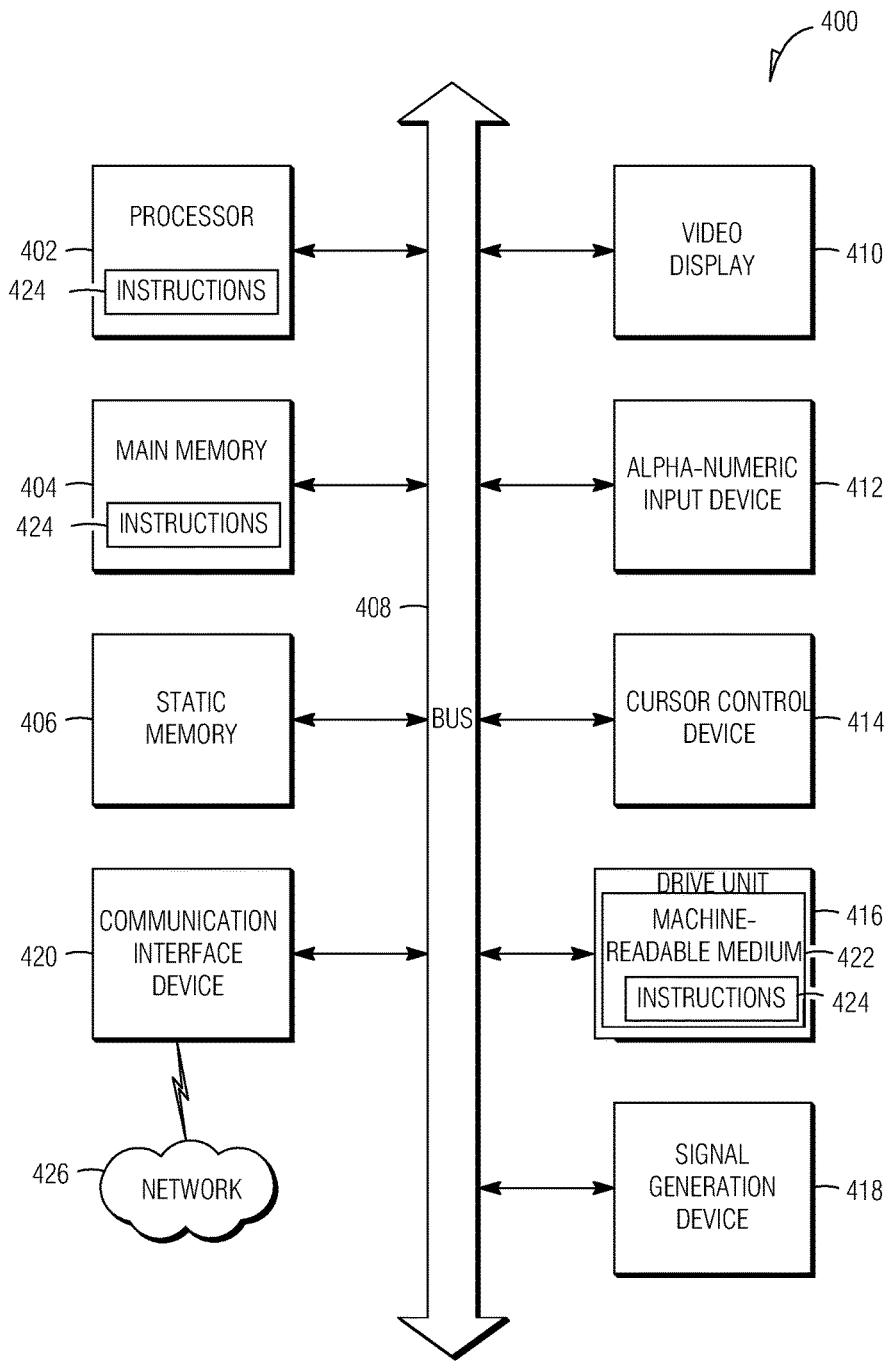
FIG. 4 illustrates a computer system, according to an example embodiment.

FIG. 4 illustrates a computing device 400 comprising one or more processors 402, a communications interface 420, a display 410, and one or more memory storage device 404, 406. In an example embodiment one or more computer programs are executed on the one more or processors to cause the computing device to perform a sync between the computer device and a mobile electronic device. In an example embodiment, the communications interface is Universal Serial Bus Mass Storage.

In an example embodiment, one or more database files are received from a mobile electronic device via the communications interface and stored on a storage device. As discussed above, the one or more database files may comprise a key file and a data file. In example embodiment, where media files are picture files, the data file comprises picture data and the key file comprises an index to the picture data.

In an embodiment, the one or more database files comprises a first database with a data file including picture data of square picture thumbnails sized such that a number (e.g., four) of columns of thumbnails can be displayed at once on the device and a second database comprising picture thumbnails matching the dimensions of the mobile electronic device's display screen. On mobile devices with displays that can be rotated between a landscape and portrait mode, there may be three databases: one with square picture thumbnails sized such that four columns of thumbnails may be displayed when the device display is in portrait mode, a second database with square thumbnails sized such that four columns of thumbnails may be displayed when the device display is in landscape mode, and a third database containing square thumbnails sized to the greater of the device's two display dimensions In various embodiments, there are three databases of picture files: a landscape mode database storing pictures oriented for a display having its width greater than its height, a portrait mode database with pictures stored oriented for a display with its height being greater than its width, and a thumbnail database. In various embodiments, when a device only displays pictures in one orientation, there may be only two databases: a full sized database with pictures the resolution of the display and a thumbnail database. In an embodiment, the size of the thumbnails is determined according to the resolution of the mobile electronic device. For example, if the resolution of the display is 320×480 (width×height) the thumbnails may be 80×80 to fit 24 thumbnails on the display. In instances where a picture file does not have square dimensions, a cropped version of the picture is used for the thumbnail.

Illustrated in FIG. 3 is an example database storing thumbnail picture data. In an example embodiment, the key file 302 includes one or more identification and offset pairs 304. As illustrated in FIG. 3 an identification (ID) 306 may be assigned to each thumbnail located in the data file 308 associated with the key file 302. This ID may be generated when a picture file is synced to the mobile electronic device. In this example database of thumbnails, the ID identifies the thumbnail. The ID may be descriptive of the file name on the computing device or may be generated using a hash code. The offset may be associated with a location in the data file 308. Therefore, in an example embodiment when the mobile electronic device needs to access a thumbnail, the MED accesses the key file and completes a lookup of the thumbnail's identification. Then, the MED goes to the location in the data file specified by the corresponding offset to locate and retrieve the picture to be displayed. In this example, a thumbnail.

In an example embodiment, the location in the data file points to picture data which includes the thumbnail data and metadata 312 associated with the thumbnail. In various embodiments, the metadata comprises dimensions of the picture file, the date the picture file was transferred, the date the picture file was last modified, the thumbnail size, and whether or not the thumbnail is encrypted.

In various embodiments, the thumbnail data comprises a header 314 and the raw thumbnail data 316. In an example embodiment, the header comprises additional metadata associated with the original picture file. For example, the additional metadata may comprise GPS geotag, orientation data, and EXIF data associated with the thumbnail or picture file. Additional space may be reserved in the header of the picture file for custom fields for use by original equipment manufacturers. In an example embodiment, the metadata is stored in a format such as v1aXwYYYYYhZZZZZ, where X is either 1 indicating the image is animated or 0, YYYYY and ZZZZZ are the width and height in pixels of the original image, and v1 indicates that this is version 1 of a format. The metadata stored in the data file may be used as an efficient means of determining information about a picture file without needing to go to the original file. For example, the GPS geotag data may be accessed to place the thumbnail on a map application without needing to retrieve the original file.

In an example embodiment, a synchronization set on the computing device is generated, wherein the synchronization set comprises one or more picture files to be stored on the mobile electronic device. In various embodiments, an interface is displayed to receive a selection of the one or more pictures files included in the synchronization set.

In an example embodiment, the one or more databases are transformed to one or more updated databases, wherein transforming comprises updating the key file to index pictures included in the synchronization set and updating the data file to include thumbnail data of the pictures included in the synchronization set.

In an embodiment, the picture files are transcoded to a format readable and displayable by the mobile electronic device. For example, if a user syncs a TIFF file with a mobile electronic device and the device cannot display the TIFF file, the file may be transcoded to a JPG file before being transferred. In an example embodiment, the one or more updated databases are transmitted to the mobile electronic device via the communications interface.

In various embodiments, the one or more computer programs causes the computing device to check for corruption in the one or more database files. For example, a check may be completed to see if the hundred largest files are present in the transferred database file. In addition to checking the largest files, a random sample of files (~5%) may be looked at for corruption. A check may be made to look at if a file is in existence and also compare the file size recorded in a transaction file (e.g., what files needed to be copied) with the actual file size.

In various embodiments, the one or more computer programs cause the computing device to check for a version of software on the mobile electronic device. If the version of the software does not support the updated database files, the database files may not be transferred.

A Computer System

FIG. 4 shows a diagrammatic representation of a machine in the example form of a computer system 400 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems are linked (e.g., either by hardwired, wireless, or a combination of hardwired and wireless connections) through a network, both perform tasks. In a distributed system environment, program modules may be located in both local and remote memory-storage devices (see below).

The example computer system 400 includes a processor 402 (e.g., a Central Processing Unit (CPU), a Graphics Processing Unit (GPU) or both), a main memory 404 and a static memory 406, which communicate with each other via a bus 408. The computer system 400 may further include a video display unit 410 (e.g., a Liquid Crystal Display (LCD) or a Cathode Ray Tube (CRT)). The computer system 400 also includes an alphanumeric input device 412 (e.g., a keyboard), a User Interface (UI) cursor controller 414 (e.g., a mouse or similar navigational input device, such as a joystick or trackpad), a disk drive unit 416, a signal generation device 418 (e.g., a speaker) and a communication or network interface device 420 (e.g., a transmitter).

The disk drive unit 416 includes a machine-readable medium 422 on which is stored one or more sets of instructions 424 and data structures (e.g., software) embodying or used by any one or more of the methodologies or functions illustrated herein. The software may also reside, completely or at least partially, within the main memory 404 and/or within the processor 402 during execution thereof by the computer system 400, the main memory 404 and the processor 402 also constituting machine-readable media.

The instructions 424 may further be transmitted or received over a network 426 via the network interface device 420 using any one of a number of well-known transfer protocols (e.g., HTTP, Session Initiation Protocol (SIP)).

The term "machine-readable medium" should be taken to include a single tangible medium or multiple tangible media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

It is to be understood that the above description is intended to be illustrative, and not restrictive. For example, the above-illustrated embodiments (and/or aspects thereof) may be used in combination with each other. Many other embodiments may be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method on a computing device, the method comprising:
   receiving, by the computing device, one or more databases from a mobile electronic device that is separate and distinct from the computing device, the one or more databases comprising a key file and a data file, wherein the data file comprises picture data including thumbnails of picture files stored on the mobile electronic device, and the key file comprises an index to the picture data, wherein the mobile electronic device retrieves the thumbnails from the one or more databases for presentation to a user on a display of the mobile electronic device;
   generating, by the computing device, a synchronization set on the computing device, wherein the synchronization set comprises one or more picture files to be stored on the mobile electronic device;
   transforming, by the computing device, the one or more databases to one or more updated databases, wherein transforming comprises updating the key file to index the one or more picture files included in the synchronization set and updating the data file, wherein updating the data file comprises
      generating, by the computing device, a set of thumbnail images for the one or more picture files in the synchronization set, where generating the set of thumbnail images comprises
         checking the data file for existing thumbnail images for the pictures files, and
         generating thumbnail images for missing thumbnail images,
      wherein each thumbnail image in the set of thumbnail images is an original thumbnail image, and wherein each thumbnail image corresponds to at least one of the one or more picture files in the synchronization set and is separate and distinct from the one or more picture files, and
      updating, by the computing device, the data file to include the set of thumbnail images of the one or more picture files included in the synchronization set,
   wherein the one or more updated databases comprise at least a portion of a data set previously existing within the one or more databases at the mobile electronic device prior to the one or more databases being received by the computing device from the mobile electronic device; and
   transmitting, by the computing device, the one or more updated databases including the set of thumbnails corresponding to the one or more picture files in the synchronization set to the mobile electronic device.

2. The method according to claim 1, wherein generating a synchronization set comprises:
   displaying, on a display device of the computing device, indicia of pictures stored on the mobile electronic device and displaying, on the display device, indicia of pictures stored on the computing device; and
   receiving a selection of pictures stored on the mobile electronic device and pictures stored on the computing device.

3. The method according to claim 1, wherein transmitting the synchronization set further comprises:
   generating one or more copy commands to copy a portion of the one or more picture files included in the synchronization set from the computing device to the mobile electronic device, wherein the portion is based on picture files stored only on the computing device or picture files that need to be updated on the mobile electronic device; and
   executing the one or more copy commands on one or more processor of the computing device and mobile electronic device.

4. The method according to claim 1, wherein generating the set of thumbnail images comprises:
   retrieving device information associated with the mobile electronic device, wherein the device information includes a resolution of a display of the mobile electronic device; and
   generating the set of thumbnail images at the resolution of the display.

5. The method according to claim 1, wherein updating the key file to index picture files included in the synchronization set comprises:
   generating index entries for thumbnail images in the set of thumbnail images missing from the key file; and
   detecting collisions between the generated index entries and existing entries in the key file.

6. The method according to claim 5, wherein detecting collisions between the generated index entries and existing entries in the key file comprises:
   determining a generated index is already in use in the key file.

7. The method according to claim 1, further comprising:
   receiving preference data for the synchronization set, wherein the preference data includes preferences for a quality of a picture and a preference for resizing the picture.

8. The method according to claim 1, wherein updating the data file comprises:
   removing a selection of picture data from the data file which has been selected for removal from the mobile electronic device.

9. A system comprising:
   a computing device comprising one or more processors, a communications interface, a display, and a storage device;

one or more computer programs executable on the one more or processors which cause the computing device to:
receive, via the communications interface, one or more databases from a mobile electronic device that is separate and distinct from the computing device, the one or more databases comprising a key file and a data file, wherein the data file comprises picture data including thumbnails of picture files stored on the mobile electronic device, and the key file comprises an index to the picture data, wherein the mobile electronic device retrieves the thumbnails from the one or more databases for presentation to a user on a display of the mobile electronic device;
store the one or more databases on the storage device;
generate a synchronization set on the computing device, wherein the synchronization set comprises one or more picture files to be stored on the mobile electronic device;
transform the one or more databases to one or more updated databases, wherein transforming comprises updating the key file to index the one or more picture files included in the synchronization set and updating the data file, wherein updating the data file comprises
generating a set of thumbnail images for the one or more picture files in the synchronization set, where generating the set of thumbnail images comprises
checking the data file for existing thumbnail images for the pictures files, and
generating thumbnail images for missing thumbnail images,
wherein each thumbnail image in the set of thumbnail images is an original thumbnail image, each thumbnail being separate and distinct from the one or more picture files and corresponding to at least one of the one or more picture files in the synchronization set, and wherein each thumbnail image is generated by applying a resizing algorithm to a corresponding picture file of the one or more picture files, and
updating the data file to include the set of thumbnail images of the one or more picture files included in the synchronization set,
wherein the one or more updated databases comprise at least a portion of a data set previously existing within the one or more databases at the mobile electronic device prior to the one or more databases being received by the computing device from the mobile electronic device; and
transmit, via the communications interface, the one or more updated databases including the set of thumbnails corresponding to the one or more picture files in the synchronization set to the mobile electronic device.

10. The system according to claim 9, wherein the key file includes one or more identification and offset pairs, wherein the identification is associated with a picture file and the offset is associated with a location in the data file.

11. The system according to claim 10, wherein the location in the data file identifies thumbnail image data and metadata associated with the picture file, wherein the metadata includes dimensions of the picture file.

12. The system according to claim 11, wherein the picture file comprises a header and the header comprises additional metadata associated with an original picture file, the additional metadata comprising GPS data of the original picture file.

13. The system according to claim 9, wherein the one or more computer programs causes the computing device to check for corruption in the one or more databases.

14. The system according to claim 9, wherein the one or more computer programs cause the computing device to check for a version of software on the mobile electronic device.

15. The system according to claim 9, wherein the one or more computer programs cause the computing device to present an interface on the display to receive a selection of the one or more pictures files included in the synchronization set.

16. The system according to claim 9, wherein the communications interface is Universal Serial Bus Mass Storage.

17. A machine-readable medium comprising instructions, which when executed by one or more processors, cause the one or more processors to:
receive one or more databases on a computing device from a mobile electronic device, wherein the mobile electronic device is separate and distinct from the computing device, the one or more databases comprising a key file and a data file, wherein the data file comprises picture data including thumbnails of picture files stored on the mobile electronic device, and the key file comprises an index to the picture data, wherein the mobile electronic device retrieves the thumbnails from the one or more databases for presentation to a user on a display of the mobile electronic device;
generate a synchronization set on the computing device, wherein the synchronization set comprises one or more picture files to be stored on the mobile electronic device;
transform the one or more databases to one or more updated databases, wherein transforming comprises updating the key file to index the one or more picture files included in the synchronization set and updating the data file, wherein updating the data file comprises
generating a set of thumbnail images for the one or more picture files in the synchronization set, where generating the set of thumbnail images comprises
checking the data file for existing thumbnail images for the pictures files, and
generating thumbnail images for missing thumbnail images,
wherein each thumbnail image in the set of thumbnail images is an original thumbnail image and wherein each thumbnail images corresponds to at least one of the one or more picture files in the synchronization set and is separate and distinct from the one or more picture files, and
updating the data file to include the set of thumbnail images of the one or more picture files included in the synchronization set,
wherein the one or more updated databases comprise at least a portion of a data set previously existing within the one or more databases at the mobile electronic device prior to the one or more databases being received by the computing device from the mobile electronic device; and
transmit the one or more updated databases including the set of thumbnails corresponding to the one or more picture files in the synchronization set to the mobile electronic device.

18. The machine-readable medium according to claim 17, wherein the instructions comprise instructions, which when executed by the one or more processors, cause the one or more processors to:

receive preference data for the synchronization set, wherein the preference data includes preferences for a quality of a picture and a preference for resizing the one or more picture files.

19. The machine-readable medium according to claim 17, wherein the instructions comprise instructions, which when executed by the one or more processors, cause the one or more processors to:

generate one or more copy commands to copy a portion of the one or more picture files included in the synchronization set from the computing device to the mobile electronic device, wherein the portion is based on picture files stored only on the computing device or picture files that need to be updated on the mobile electronic device; and execute the one or more copy commands on one or more processor of the computing device and mobile electronic device.

\* \* \* \* \*